US012525213B2

(12) United States Patent
Eisenmann

(10) Patent No.: US 12,525,213 B2
(45) Date of Patent: Jan. 13, 2026

(54) MUSICAL INSTRUMENT PICKUP, CORRESPONDINGLY EQUIPPED SYSTEM, AND USE OF AN AUTOMOTIVE AUDIO BUS ($A^2B$) FOR SAME

(71) Applicant: Gismo Industrie-Holding & Verwaltung AG, Velbert (DE)

(72) Inventor: Michael Eisenmann, Dorsten (DE)

(73) Assignee: Gismo Industrie-Holding & Verwaltung AG, Velbert (DE)

( * ) Notice: Subject to any disclaimer, the term of this patent is extended or adjusted under 35 U.S.C. 154(b) by 0 days.

(21) Appl. No.: 18/854,149

(22) PCT Filed: Apr. 11, 2023

(86) PCT No.: PCT/DE2023/100265
§ 371 (c)(1),
(2) Date: Oct. 4, 2024

(87) PCT Pub. No.: WO2023/198249
PCT Pub. Date: Oct. 19, 2023

(65) Prior Publication Data

US 2025/0111840 A1 Apr. 3, 2025

(30) Foreign Application Priority Data

Apr. 11, 2022 (DE) ......................... 102022108798.0

(51) Int. Cl.
*G10H 3/18* (2006.01)

(52) U.S. Cl.
CPC ............... *G10H 3/188* (2013.01); *G10H 3/18* (2013.01); *G10H 2240/201* (2013.01); *G10H 2240/301* (2013.01)

(58) Field of Classification Search
CPC ........... G10H 3/12; G10H 3/14; G10H 3/146; G10H 3/18–186; G10H 3/22; G10H 2220/461–565
See application file for complete search history.

(56) References Cited

U.S. PATENT DOCUMENTS 7,399,918 B2 7/2008 Gibson
8,859,874 B2 * 10/2014 Kuroki .................. G10H 3/186 84/629

(Continued)

OTHER PUBLICATIONS

Anonymous, A2B Audio Bus, https://www.analog.com/en/applications/technology/a2b-audio-bus.html.

(Continued)

*Primary Examiner* — Christopher Uhlir
(74) *Attorney, Agent, or Firm* — Laurence P. Colton; Smith Tempel Blaha LLC

(57) ABSTRACT

A musical instrument pickup, in particular for a plucked string instrument and/or a bowed string instrument. The pickup comprises at least one sensor which is designed to convert soundwaves detected by the sensor into electric signals. The pickup has a digital audio bus interface which is designed to transmit electric signals and supply an electric current to at least parts of the musical instrument pickup via a connection cable which can be releasably connected or captively connected to the digital audio bus interface and which only has two wires or at least two wires. The musical instrument pickup system can be equipped with the musical instrument pickup and can be used as an automotive audio bus for or as an audio bus interface of the pickup.

21 Claims, 2 Drawing Sheets

(56) References Cited

U.S. PATENT DOCUMENTS

Figure 1:
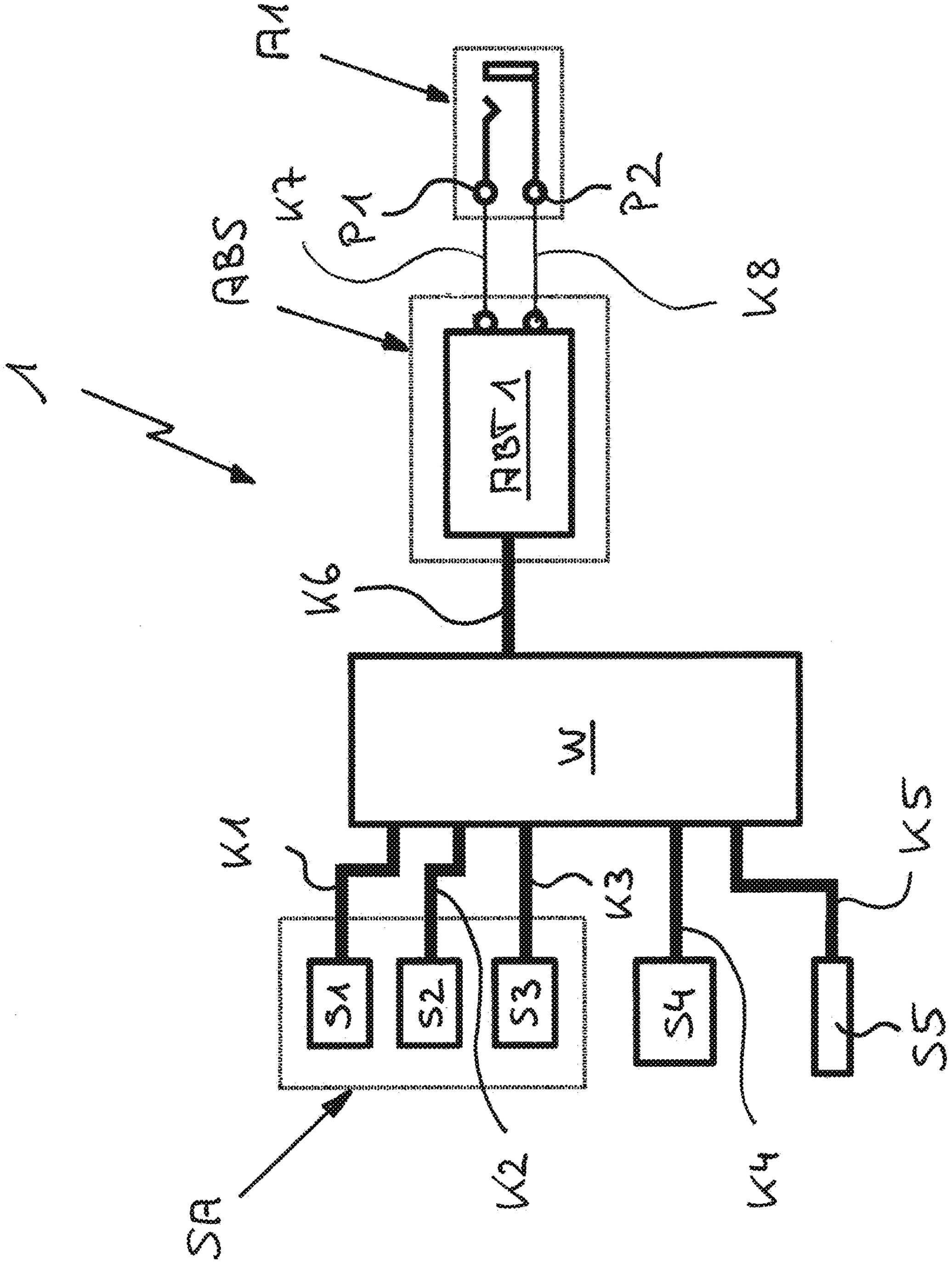

| | | | | |
|---|---|---|---|---|
| 10,431,194 | B2 * | 10/2019 | May | G10H 3/26 |
| 10,586,518 | B2 * | 3/2020 | Jalgha | G10H 3/22 |
| 2008/0047416 | A1 | 2/2008 | Cummings | |
| 2017/0076705 | A1 | 3/2017 | Iori | |

OTHER PUBLICATIONS

Rocchi, N. et al., A Modular, Low Latency, A2B-based Architecture for Distributed Multichannel Full-Digital Audio Systems, 2021 Immersive and 3D Audio, Sep. 8, 2021, p. 1-8.

* cited by examiner

MUSICAL INSTRUMENT PICKUP, CORRESPONDINGLY EQUIPPED SYSTEM, AND USE OF AN AUTOMOTIVE AUDIO BUS ($A^2B$) FOR SAME

TECHNICAL FIELD

The present invention relates to a musical instrument pickup, in particular for a plucked string instrument and/or a bowed string instrument. The present invention further relates to a musical instrument pickup system. Finally, the present invention relates to the use of a physical automotive audio bus ($A^2B$) for an audio bus interface or as an audio bus interface of a musical instrument pickup or of a musical instrument pickup system.

PRIOR ART

Pickups of the type in question are used to capture the soundwaves generated by a musical instrument and convert them into electric signals. These signals can then be amplified, for example, by a suitable means and emitted again as soundwaves via a loudspeaker. For this purpose, the pickup comprises at least one sensor, the type of which is based on the functional principle of the respective musical instrument. For example, a pickup used for electric guitars usually has a sensor with at least one coil arranged directly below the strings, so that the vibrations of the metal strings, which exhibit a ferromagnetic material generate an electromagnetic induction within the coil. The pickup of the sound of acoustic musical instruments, on the other hand, is based on detecting the vibrations that are present in the form of airborne and/or structure-borne sound. Since such musical instruments usually have their own sound body, a microphone placed nearby is sufficient. However, this leads to acceptable sound capture only under optimal conditions, which can only be achieved in a room specially designed for this purpose, such as a recording studio. In order to largely rule out fluctuations resulting from movements and the recording of unwanted background noise in the airborne sound as well as audio feedback, the pickup, which includes a sensor in the form of a microphone, can also be arranged directly on the musical instrument. In such direct contact with the musical instrument, the pickup can have at least one additional sensor, which serves, for example, to capture structure-borne sound. In any case, the aim is to capture and reproduce the sound of the respective instrument as naturally and authentically as possible.

U.S. Pat. No. 4,989,491 A discloses a stringed musical instrument with a pickup, which comprises at least one sensor. The at least one sensor is designed to capture the soundwaves emanating from the musical instrument and convert them into electric signals.

The signals generated by the pickup when playing the musical instrument are transmitted to an audio system via a connection cable so that they can be reproduced, for example, only in amplified form via at least one loudspeaker. The power supply of the pickup, which is usually equipped with a preamplifier, is typically provided by a suitable power storage device which for example is in the form of a battery that is carried along on or in the musical instrument. Furthermore, the use of two-wire instrument cables (inner conductor and shielding) has become established for connecting instruments to an audio system, which are typically connected via a jack plug connection. However, as the number of sensors increases, the architecture of the connections required for this increases so that the pickups known to date still offer room for improvement.

OBJECT OF THE INVENTION

Against this background, the present invention is based on the object of further developing a musical instrument pickup and a musical instrument pickup system equipped therewith in such a way that they allow for an overall simple structure and as reduced cabling as possible, even with a large number of sensors.

DESCRIPTION OF THE INVENTION

Within the present description, the musical instrument pickup can also be referred to simply as pickup or pickup for musical instruments, which however basically always refers to a musical instrument pickup.

According to this, the invention proposes with respect to the musical instrument pickup that the pickup should now have an audio bus interface designed to transmit electric signals and supply an electric current to at least parts of the musical instrument pickup via a connection cable (phantom power). The connection between the audio bus interface and the connection cable can preferably be designed to be releasable or captive. Particularly preferably, the audio bus interface can be designed in such a way that a connection with a connection cable designed as an unshielded or shielded, in particular twisted, two-wire line is possible.

The audio bus interface is configured so that several sensors can be connected in series as a “daisy chain”, which means that redundant cabling can be reduced to a minimum. At the same time, the audio bus interface offers the possibility of supplying power to at least some components of the pickup via a single, preferably only two-wire, connection cable. Said possibility of supplying power “from outside” eliminates the need for a local energy source that would otherwise be required in or on the musical instrument or in or on the pickup. This usually involves at least one replaceable or permanently installed power source, such as a battery or a rechargeable battery pack. In addition to eliminating the associated weight and mass that may even affect the sound of the musical instrument, this also effectively prevents interference or even a sudden failure in the transmission, which can occur if the energy level of such a power source is too low. The latter can also have their origin in contact problems that occur when changing the energy source or due to movements and vibrations.

According to a preferred development of the basic inventive concept, the pickup can comprise at least one A/D converter which is designed to encode the electric signals present as analog signals into digital signals. This is of relevance in particular if the sensor(s) cannot already provide digital signals on their own. If the or at least one of the sensors can already deliver a digital signal, the A/D converter can be omitted.

The invention provides for the at least one sensor to be able to be connected directly to the audio bus interface. Alternatively, the sensor or at least one of the sensors can be connected to the audio bus interface with the interposition of an A/D converter. The A/D converter can be the A/D converter mentioned above. For the purpose of the invention, a direct connection is also understood to mean a connection that does not require the additional interposition of an A/D converter. This means that any indirect connection between sensor(s) and the audio bus interface also falls under such a direct connection, provided that it does not include an additional A/D converter.

Preferably, the audio bus interface can be a digital bus that can be controlled in a clocked manner. Advantageously, said bus can be designed as a two-wire bus.

According to a particularly preferred embodiment of the musical instrument pickup according to the invention, the audio bus interface of the pickup can have an audio bus transceiver. The audio bus transceiver is capable of both sending and receiving electric signals. The audio bus transceiver can therefore also be referred to as a transceiver.

For a preferably releasable coupling of a connection cable with the audio bus interface, the latter can have a connector which has only two contact poles. Advantageously, said connector can be connected to the audio bus transceiver.

According to a particularly preferred embodiment, the connector can be a jack socket. Alternatively, said connector may comprise a jack socket. Specifically, as regards a connection cable having only two wires, the jack socket can be a mono jack socket. In this way, it is possible to use a connection cable that is well established among musicians and that can be coupled to the musical instrument pickup, or more precisely to its connector, via a jack plug connection. Typically, 6-meter-long connection cables are used, as are commonly found on stage and in recording studios.

Particularly advantageously, the audio bus transceiver of the audio bus interface can be configured to establish a data connection via the connection cable. The data connection that can be established in this way can preferably be a multi-channel and/or bidirectional data connection. The invention provides for the audio bus transceiver to be able to thus establish a data connection with another audio bus transceiver. In contrast to conventional pickups, the transmission of data between the audio bus transceivers connected to each other via the connection cable can be based on a proprietary standard. In other words, the signal emanating from the audio bus transceiver of the musical instrument pickup cannot be fed directly into a conventional terminal device, such as an amplifier and/or mixer, so that the audio bus transceiver connected upstream of such a terminal device first converts the proprietary signals into an audio signal, which can then be processed by the respective terminal device. The audio bus transceiver located at the end of the connection cable opposite the musical instrument pickup can therefore also be referred to as an end transceiver. Compared to a classic transceiver-receiver system, data can be communicated bidirectionally.

Even though the transmission of the signals of two sensors via a two-wire line can basically also be implemented analogously, the invention aims at providing a multi-channel digital data connection for transmitting the signals of preferably more than two sensors. In particular, when there are more than two sensors, the digital data connection has advantages over analog signal transmission in terms of the necessary infrastructure and/or allows such a transmission to be implemented using a two-wire line.

It is also conceivable to connect several audio bus transceivers in series, wherein the at least one audio bus transceiver located between the musical instrument pickup and the end transceiver can then be referred to as an intermediate transceiver. It can act as a "slave" and feed signal packets into the bus, while the end transceiver, for example, works as a "master." It can form the necessary part of a preamplifier, i.e., the input stage so to speak. This can then typically be followed by a microcontroller or DSP, which is used for digital signal processing with control elements such as tone control and volume. All audio bus transceivers form nodes within the network designed in this way, the clock of which is synchronized.

The invention provides for the musical instrument pickup to comprise at least one sensor designed to detect airborne sound (airborne sound sensor) and at least one sensor designed to detect structure-borne sound (structure-borne sound sensor). An airborne sound sensor can also be referred to as a microphone, while a structure-borne sound sensor is also known as a contact pickup. Alternatively or additionally, at least one further sensor can be provided which is designed to convert pressure and/or mechanical stress into electric signals. Such a sensor can also be referred to as a piezoelectric sensor. Depending on the design, the respective sensor itself can be connected to the audio bus transceiver and/or—where at least one A/D converter is present—to the latter via a 2-wire or multi-wire cable having more than two wires.

The sound of a played note is a complex and complicated process. Its origin is not only at the location on or in the musical instrument where a sensor of the musical instrument pickup is located. In fact, there are many sources that only when combined in the acoustic field generate the actual sound of the musical instrument as received by the human ear. The detection of the sound can be optimized by using two or more sensors, in particular at different locations on the musical instrument, which have different properties (airborne sound/structure-borne sound sensor). The digital processing of the signals provided directly by the sensors or by an A/D converter results in a significant improvement in sound reproduction. This works best when the different source signals can be processed independently of one another in the frequency domain and time domain.

The now presented musical instrument pickup according to the invention presented allows for an overall simple structure and as reduced cabling as possible, even with a large number of sensors. At the same time, it allows for using the plug connection and connection cable that musicians are used to, for example to an amplifier.

The invention is further directed to a musical instrument pickup system comprising at least one musical instrument pickup according to the invention as described above and a connection cable which can be preferably releasably connected to the connection of said pickup. The advantages resulting from this have already been explained in more detail in connection with the musical instrument pickup according to the invention, so that, in order to avoid repetition, reference is made at this point to the previous explanations in this respect.

According to a preferred development of the musical instrument pickup system according to the invention, said system can comprise a remote station, which has an audio bus transceiver. That audio bus transceiver is then connected or can be connected to the audio bus transceiver of the musical instrument pickup via the connection cable. For this purpose, the remote station can preferably have a connector, in particular connected to the remote station's audio bus transceiver, with which the connection cable is connected or can be connected, preferably in a releasable manner. Particularly advantageously, the connector of the remote station can be designed as a jack socket, in particular corresponding to a jack plug of the connection cable, or can comprise such a jack socket.

The connection cable can basically be a shielded or an unshielded cable. However, given the structure of the musical instrument pickup system according to the invention, there is advantageously no need for such shielding. The connection cable can have only two wires that can preferably be twisted together. Alternatively, the connection cable can have more than two wires; however, only two wires thereof are or can be conductively connected to the digital audio bus interface of the musical instrument pickup.

The invention further relates to the use of a physical automotive audio bus ($A^2B$) for an audio bus interface or as an audio bus interface of a musical instrument pickup. Preferably, the physical automotive audio bus ($A^2B$) can be used in connection with the musical instrument pickup according to the invention. Alternatively or additionally, the invention is directed to the use of a physical automotive audio bus ($A^2B$) for a musical instrument pickup system with a connection cable, which can preferably be the musical instrument pickup system according to the invention.

Alternatively or additionally, the invention provides for the use of a 10BASE-T1L transceiver for an audio bus interface (ABS) or as an audio bus interface of a musical instrument pickup. Alternatively, a 10BASE-T1L-capable device can be used instead of the 10BASE-T1L transceiver. Preferably, the physical 10BASE-T1L transceiver or the 10BASE-T1L-capable device can be used in connection with the musical instrument pickup according to the invention. Also alternatively or additionally, the invention is directed to the use of a physical 10BASE-T1L transceiver or a 10BASE-T1L-capable device for a musical instrument pickup system with a connection cable, which can preferably be the musical instrument pickup system according to the invention.

In the context of the invention, a 10BASE-T1L-capable device is understood to mean an electronic component or an arrangement of such components which enables the transmission of the signals resulting from the sensors or the A/D converter by means of 10BASE-T1L.

Both the 10BASE-T1L transceiver and the 10BASE-T1L-capable device are designed to transmit signals at a rate of 10 Mbit/s. These signals are Ethernet signals and therefore digital signals. They can be transmitted via a connection cable in the form of a two-wire line with only two wires, in particular twisted ones, wherein segment lengths of up to 1,000 m are possible. A voltage supply to components can also be realized via such a connection. So the use of 10BASE-T1L could deliver up to 60 W of power, wherein up to 50 W of actually usable power could be available.

Instead of the 10BASE-T1L media type used, it is conceivable to replace it with another network technology, such as 10BASE-2, 10BASE-5, 10BASE-F or 10BASE-36, depending on the design and requirements.

FIGURE DESCRIPTION

Figure 2:
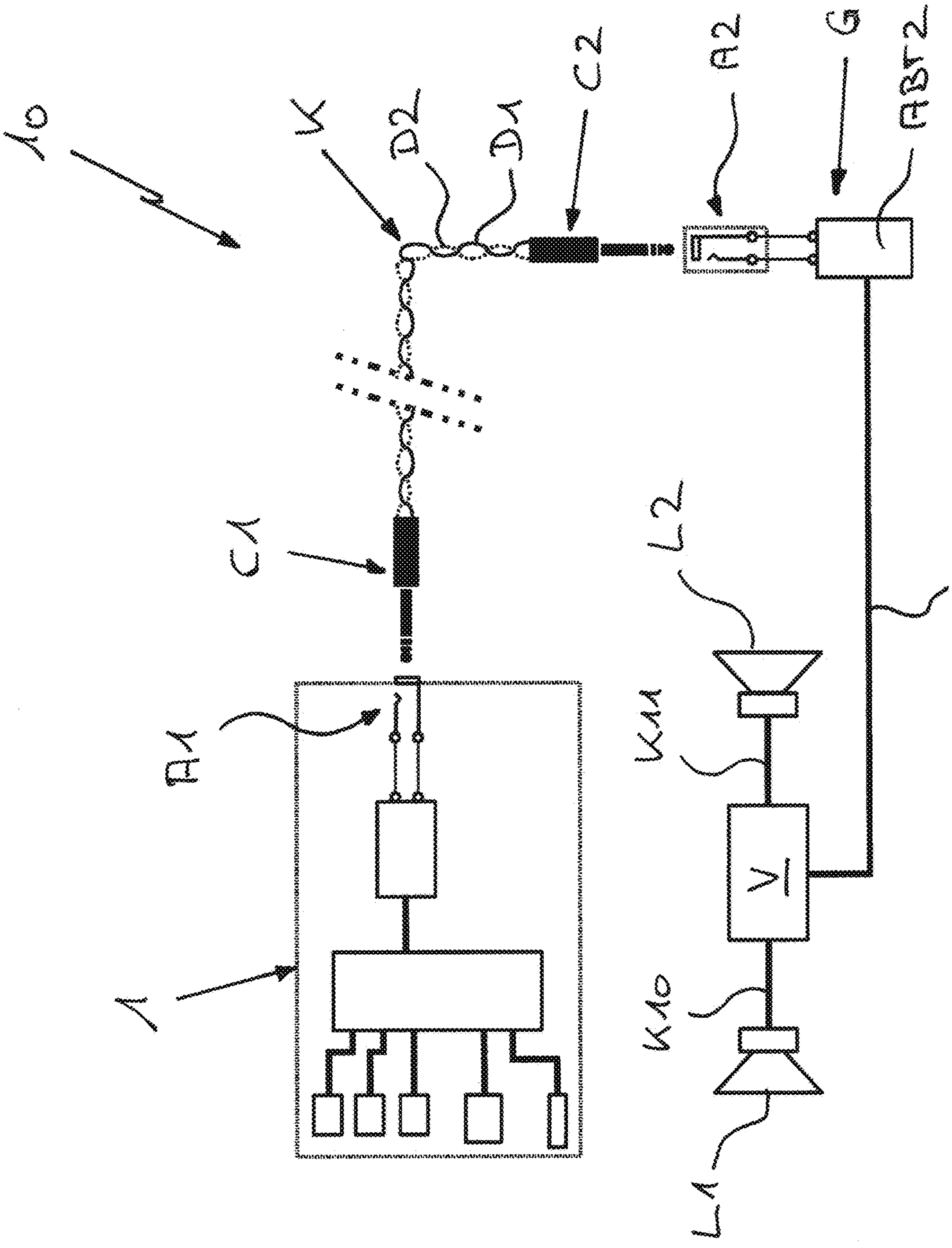

The invention is explained in more detail below with reference to an exemplary embodiment shown schematically in the single figure, from which further advantageous details and effects can emerge. In the drawings:

FIG. 1 shows a musical instrument pickup according to the invention in a purely schematic representation; and FIG. 2 shows a musical instrument pickup system according to the invention with the musical instrument pickup of FIG. 1 in a purely schematic representation.

DESCRIPTION OF PREFERRED EMBODIMENTS

FIG. 1 shows a musical instrument pickup 1 according to the invention in a its schematic representation. In the embodiment shown here, the musical instrument pickup 1 comprises, purely by way of example, a total of five sensors S1-S5, a total of three sensors S1-S3 of which, also purely by way of example, are designed to detect soundwaves in the form of airborne sound. Each of these sensors S1-S3 can also be referred to as a microphone. Said sensors S1-S3 are combined to form an array SA in order to be able to record, in the best possible way, the sound of a musical instrument (not shown in detail herein) equipped with the musical instrument pickup 1. A fourth sensor S4 is configured to detect soundwaves in the form of structure-borne sound. When used, in particular, in or on a plucked string instrument or bowed string instrument, the fourth sensor S4 can be attached directly to the sound body, in particular to the top, of said musical instrument. A fifth and, in the example shown herein, last sensor S5 is designed as a piezoelectric sensor, which serves to convert pressure and/or mechanical stress into electric signals. When used in a plucked string instrument or bowed string instrument, the fifth sensor S5 can, for example, be arranged in the bridge below the strings in order to record the vibrations generated by the strings and convert them into electric signals.

In the example shown herein, all sensors S1-S5 each deliver electric signals which are present in the form of analog signals. In order to encode them into digital signals, the sensors S1-S5 are first connected to an A/D converter W. For this purpose, each of the sensors S1-S5 is connected in a signal transmitting manner to the A/D converter W via its own cable line K1-K5. After encoding the analog signals coming from sensors S1-S5, they are passed on as digital signals to an audio bus interface ABS. For this purpose, the corresponding digital audio bus interface ABS is connected in a signal transmitting manner to the A/D converter W via a suitable cable line K6.

Compared to the exemplary embodiment shown, in which each sensor S1-S5 is coupled to the audio bus interface ABS via the A/D converter W, at least one of the sensors S1-S5 can of course also be connected directly to the audio bus interface ABS. This requires for this sensor S1-S5 to be designed to supply digital signals.

The digital audio bus interface ABS is a two-wire digital bus that can be controlled in a clocked manner. The audio bus interface ABS has an audio bus transceiver ABT1, which is designed to transmit $I^2S$ audio and $I^2C$ control data together with clock pulse and power. Furthermore, the audio bus interface ABS also has a connector A1, which has only two contact poles P1, P2. Both contact poles P1, P2 of the connector A1 are each connected in a single-wire and signal transmitting manner to the audio bus transceiver ABT1. To illustrate this, the two contact poles P1, P2 in FIG. 1 are each coupled to a contact of the audio bus transceiver ABT1 via a cable line K7, K8. Of course, a two-wire cable line can also be used for this purpose, the two wires of which then connect one of the contact poles P1, P2 of the connector A1 with one of the two contacts of the audio bus transceiver ABT1.

Finally, the connector A1 comprises a jack socket or is designed as such, which serves to receive, in a signal transmitting manner, a jack plug (not shown in detail herein).

FIG. 2 shows a musical instrument pickup system 10 according to the invention, which in the exemplary embodiment shown herein comprises a single musical instrument pickup, which is the previously described musical instrument pickup 1 according to the invention. Another component of the musical instrument pickup system 10 is a connection cable K, which is preferably releasably connectable or couplable to the connector A1 of the musical instrument pickup 1. For the sake of clarity, the length of the connection cable K is variable, which is indicated by two parallel, spaced-apart, inclined and discontinuous lines. A jack plug C1, C2 is arranged at both ends of the connection cable K. As can be seen, the connection cable K in the example shown herein is a two-wire line having two twisted wires D1, D2. For clarity, one of the wires D1 is shown with a continuous wavy line, while the other wire D2 is shown as a discontinuous wavy line. The connection cable K can preferably be designed to be unshielded, wherein, alternatively, a shielded variant can also be used. Of course, the connection cable K can also have more than two wires D1, D2; however, only two wires D1, D2 thereof are connected conductively and thus in a signal transmitting manner with the two jack plugs C1, C2. In any case, the connection cable K can be connected to the audio bus interface ABS of the musical instrument pickup 1 by coupling one of its two jack plugs C1 to the connector A1 of the musical instrument pickup 1 (only indicated herein).

In order to achieve processing of the signals that can be transmitted in this way, a remote station G is provided in the exemplary embodiment shown herein, which also comprises an audio bus transceiver ABT2 with a connector A2 in the form of a jack socket. Alternatively, the connector A2 may comprise such a jack socket. What has already been said about the musical instrument pickup 1 applies also to the design of the connector A2 and its connection to the audio bus transceiver ABT2 of the remote station G. So, the connection cable K is also connectable to the audio bus transceiver ABT2 of the remote station G by coupling the other jack plug C2 of the connection cable K to its connector A2 (also only indicated herein).

Advantageously, both connectors A1, A2 can be designed for coupling a jack plug C1, C2 with a ¼" (equivalent to 6.35 mm) outer diameter, as is commonly used for music production devices and on musical instruments equipped with a pickup. Since the connectors A1, A2 each have only two contact poles P1, P2, the respective jack socket can preferably be a mono jack socket. Of course, at least one of the jack sockets can also be designed as a stereo jack socket having more than two contact poles P1, P2 (not shown herein), in which case only two of the total of three contact surfaces of the stereo jack socket separated from one another by insulators are connected to one of the two contact poles P1, P2 in a signal-transmitting manner.

In any case, the audio bus transceiver ABT1 is designed to establish a data connection to the remote station G via the connection cable K. Said data connection is preferably a multi-channel and/or bidirectional connection. The digital audio bus interface ABS of the musical instrument pickup 1 is configured both to transmit electric signals to the remote station G and to supply an electric current to at least part of the musical instrument pickup 1 via the remote station G.

The audio bus transceiver ABT2 of the remote station G is provided to translate the signals arriving from the audio bus transceiver ABT1 of the musical instrument pickup 1 into a different protocol, which can then be further processed by devices commonly used in this area. Said protocol can be a classic protocol such as $I^2C$, $I^2S$, TDM, or PDM.

In the simplest case, the remote station G can be connected for example to an amplifier V via another cable line K9, which amplifier V is in turn connected to a loudspeaker L1, L2 via a cable line K10, K11 in each case. In this way, the musical instrument pickup 1 can transmit the sound detected by a musical instrument (not shown in detail herein) to the remote station G via connection cable K, from where the signals generated for this purpose can be amplified by the amplifier V and emitted again by the loudspeakers L1, L2 quasi in real time.

Particularly preferably, a physical automotive audio bus ($A^2B$) is used as an audio bus interface ABS for both the musical instrument pickup 1 and the musical instrument pickup system 10.

LIST OF REFERENCE SIGNS

1—Musical instrument pickup
10—Musical instrument pickup system
A1—Connection of 1
A2—Connection of G
ABT1—Audio bus transceiver of 1
ABT2—Audio bus transceiver of G
C1—Jack plug of K
C2—Jack plug of K
D1—Wire of K
D2—Wire of K
G—Remote station
K—Connection cable of 10
K1—Cable line between S1 and W
K2—Cable line between S2 and W
K3—Cable line between S3 and W
K4—Cable line between S4 and W
K5—Cable line between S5 and W
K6—Cable line between W and ABT1
K7—Cable line between ABT1 and P1 of A1
K8—Cable line between ABT1 and P2 of A1
K9—Cable line between ABT2 and V
K10—Cable line between V and L1
K11—Cable line between V and L2
L1—Loudspeaker
L2—Loudspeaker
P1—Contact pole of A1
P2—Contact pole of A1
SA—Array of S1-S3
S1—Sensor of 1
S2—Sensor of 1
S3—Sensor of 1
S4—Sensor of 1
S5—Sensor of 1
W—A/D converter of 1

The invention claimed is:

1. A musical instrument pickup (1) comprising sensors (S1 S5) for arrangement on or in a musical instrument and a digital audio-bus-interface (ABS), wherein:
- at least a first of the sensors (S1 S5) is designed as an airborne sound-sensors (S1 S3) in order to convert airborne sound detected by that sensor into electric signals;
- at least a second of the sensors (S1 S5) is designed as a piezoelectric-sensor (S5) in order to convert pressure and/or mechanical stress into electric signals;
- at least a third of the sensors (S1-S5) is a structure-borne sound-sensor (S4) designed to detect and convert structure-borne sound into electric signals; and
- the digital audio-bus-interface (ABS) comprises a connector (A1) with only two contact poles (P1, P2) is designed to both establish a multi-channel digital data connection for transmitting the electric signals of the sensors (S1 S5) and to supply an electric current to at least parts of the musical instrument pickup (1) via a connection cable (K) in the form of an unshielded or shielded two-wire line, wherein the connector (A1) is connected to an audio-bus-transceiver (ABT1) and is or comprises a jack socket.

2. The musical instrument pickup (1) according to claim 1, further comprising at least one A/D converter (W) which is designed to encode the electric signals present as analog signals into digital signals.

3. The musical instrument pickup (1) according to claim 2, wherein at least one of the sensors (S1 S5) is connected to the audio bus interface (ABS) directly or with the interposition of the A/D converter (W).

4. The musical instrument pickup (1) according to claim 1, wherein the audio-bus-interface (ABS) is a two-wire digital bus that can be controlled in a clocked manner.

5. The musical instrument pickup (1) according to claim 1, wherein the audio-bus-interface (ABS) comprises an audio bus transceiver (ABT1).

6. The musical instrument pickup (1) according to claim 5, wherein the audio-bus-transceiver (ABT1) is designed to establish a data connection via the connection cable (K) with another audio bus transceiver (ABT2).

7. A musical instrument pickup system (10), comprising at least one musical instrument pickup (1) according to claim 1 and a connection cable (K) which is releasably connected to the connector (A1) of the musical instrument pickup (1).

8. The musical instrument pickup system (10) according to claim 7, further comprising a remote station (G) with another audio-bus-transceiver (ABT2), which is connected to the audio bus transceiver (ABT1) of the musical instrument pickup (1) via the connection cable (K), which is connected to a connector (A2) of the remote station (G).

9. The musical instrument pickup system (10) according to claim 7, wherein the connection cable (K) is shielded or unshielded.

10. The musical instrument pickup system (10) according to claim 7, wherein the connection cable (K) has at least two wires (D1, D2), only two of which at least two wires (D1, D2) are conductively connected to the digital audio bus interface (ABS) of the musical instrument pickup (1).

11. The musical instrument pickup (1) according to claim 1, further comprising a physical automotive-audio-bus ($A^2B$) as an audio-bus-interface (ABS).

12. The musical instrument pickup system (10) comprising a connection cable (K) according to claim 7, further comprising a physical automotive-audio-bus ($A^2B$) as an audio-bus-interface (ABS).

13. The musical instrument pickup (1) according to claim 1, further comprising a physical 10BASE-T1L-transceiver or a 10BASE-T1L-capable device as an audio-bus-interface (ABS).

14. The musical instrument pickup system (10) comprising a connection cable (K) according to claim 7, further comprising a physical 10BASE-T1L-transceiver or a 10BASE-T1L-capable device as an audio bus interface (ABS).

15. The musical instrument pickup (1) according to claim 1, wherein the structure-borne sound-sensor (S4) is a contact pickup.

16. The musical instrument pickup (1) according to claim 1, wherein the unshielded or shielded two-wire line is a twisted two-wire line.

17. The musical instrument pickup (1) according to claim 1, wherein the two-wire line is releasably connected or captively connected to its connector (A1).

18. The musical instrument pickup (1) according to claim 6, wherein the data connection is selected form the group consisting of multi-channel data connections and bidirectional data connections.

19. The musical instrument pickup (1) according to claim 8, wherein the connection cable (K) is releasably connected to the connector (A2) of the remote station (G).

20. The musical instrument pickup system (10) according to claim 10, wherein the at least two wires (D1, D2) are twisted wires.

21. The musical instrument pickup (1) according to claim 1, wherein the jack socket is a mono jack socket.

* * * * *